(12) United States Patent
Kuybeda et al.

(10) Patent No.: US 10,666,880 B2
(45) Date of Patent: May 26, 2020

(54) INFRARED CAMERA ASSEMBLY FOR A VEHICLE

(71) Applicant: Adasky, Ltd., Yokneam Illit (IL)

(72) Inventors: Oleg Kuybeda, Portland, OR (US); Vitaly Kuperman, Maalot (IL)

(73) Assignee: Adasky, Ltd., Yokneam Illit (IL)

( * ) Notice: Subject to any disclaimer, the term of this patent is extended or adjusted under 35 U.S.C. 154(b) by 0 days.

(21) Appl. No.: 16/234,145

(22) Filed: Dec. 27, 2018

(65) Prior Publication Data

US 2019/0158765 A1    May 23, 2019

Related U.S. Application Data

(63) Continuation-in-part of application No. 15/841,995, filed on Dec. 14, 2017, now Pat. No. 10,175,112, and
(Continued)

(51) Int. Cl.
*H04N 5/33*         (2006.01)
*G01J 5/08*         (2006.01)
(Continued)

(52) U.S. Cl.
CPC .............. *H04N 5/33* (2013.01); *G01J 5/0806* (2013.01); *G01J 5/0875* (2013.01);
(Continued)

(58) Field of Classification Search
CPC ...... H04N 5/33; H04N 5/2257; H04N 5/2254; H04N 5/2253; H04N 5/2256; B60R 11/04; B60R 2300/103; G01J 5/0806
See application file for complete search history.

(56) References Cited

U.S. PATENT DOCUMENTS 5,173,443 A    12/1992 Biricik et al.
5,414,439 A     5/1995 Groves et al.
(Continued)

FOREIGN PATENT DOCUMENTS

CN    204031303 U    12/2014
CN    205175557 U     4/2016
(Continued)

OTHER PUBLICATIONS

International Search Report and Written Opinion of International Searching Authority for PCT/US2018/067722, ISA/RU, Moscow, Russia, dated May 7, 2019.
(Continued)

*Primary Examiner* — David P Porta
*Assistant Examiner* — Fani Boosalis
(74) *Attorney, Agent, or Firm* — M&B IP Analysts, LLC

(57) ABSTRACT

An infrared camera assembly for a vehicle. The assembly includes: a vehicle component having a front surface; a shutterless far-infrared (FIR) camera mounted within the vehicle component, wherein the shutterless FIR camera is utilized to output at least one thermal video stream processed by the autonomous vehicle system; and a protective window disposed on at least a portion of the front surface of the vehicle component, where the protective window is positioned to be aligned with a lens of the FIR camera, so as to allow the shutterless FIR camera to capture images therethrough.

18 Claims, 9 Drawing Sheets

Related U.S. Application Data a continuation-in-part of application No. 15/799,436, filed on Oct. 31, 2017.

(60) Provisional application No. 62/610,739, filed on Dec. 27, 2017.

(51) Int. Cl.
*H04N 5/225* (2006.01)
*B60R 11/04* (2006.01)

(52) U.S. Cl.
CPC ......... *H04N 5/2254* (2013.01); *H04N 5/2257* (2013.01); *H04N 5/22521* (2018.08); *B60R 11/04* (2013.01); *B60R 2300/103* (2013.01)

(56) References Cited

U.S. PATENT DOCUMENTS

| | | | |
|---|---|---|---|
| 5,613,968 | A | 3/1997 | Lin |
| 6,559,447 | B2 | 5/2003 | Wood |
| 6,759,949 | B2 | 7/2004 | Miyahara |
| 7,402,802 | B1 | 7/2008 | Terre et al. |
| 7,862,593 | B2 | 1/2011 | Clement et al. |
| 7,965,336 | B2 * | 6/2011 | Bingle .................. B60R 11/04 348/374 |
| 8,471,911 | B2 | 6/2013 | Kallhammer et al. |
| 8,581,982 | B1 | 11/2013 | Haley et al. |
| 8,743,207 | B2 | 6/2014 | Boulanger et al. |
| 8,759,717 | B2 | 6/2014 | Chamberlain |
| 8,791,878 | B2 | 7/2014 | Yamazaki et al. |
| 9,061,632 | B2 | 6/2015 | Toyofuku |
| 9,090,205 | B2 | 7/2015 | Nagaoka et al. |
| 9,377,363 | B2 | 6/2016 | Boulanger et al. |
| 9,555,736 | B2 | 1/2017 | Solar et al. |
| 2002/0162963 | A1 | 11/2002 | Lannestedt et al. |
| 2003/0146199 | A1 | 8/2003 | Sol et al. |
| 2007/0216768 | A1 | 9/2007 | Smith et al. |
| 2008/0110254 | A1 | 5/2008 | Zhao et al. |
| 2008/0203079 | A1 | 8/2008 | Veerasamy et al. |
| 2009/0062859 | A1 | 3/2009 | Mahoney et al. |
| 2010/0237055 | A1 | 9/2010 | Rousseau et al. |
| 2012/0209332 | A1 | 8/2012 | Janowski |
| 2013/0062228 | A1 | 3/2013 | Danilov |
| 2014/0027433 | A1 | 1/2014 | Lisinski et al. |
| 2014/0098238 | A1 | 4/2014 | Boulanger et al. |
| 2016/0075211 | A1 | 3/2016 | Kim |

FOREIGN PATENT DOCUMENTS

| | | |
|---|---|---|
| JP | 2004104632 A | 4/2004 |
| JP | 2014032337 A | 2/2014 |
| WO | 2004047421 A2 | 6/2004 |
| WO | 2014106276 A2 | 7/2014 |

OTHER PUBLICATIONS

Preliminary Rejection for Korean Patent Application No. 10-2018-0161769 dated Apr. 16, 2019, KIPO, Korea.

The European Search Report for EP Application No. 18212592.2 dated Apr. 9, 2019, EPO, Munich, Germany.

Germanium window, ø 25.4 mm × 3.0 mm, Del Mar Photonics, San Diego, CA., URL: http://www.dmphotonics.com/Germanium-Optics/Germanium%20Windows%20and%20Lenses%20for%20Thermography.htm.

Germanium Windows with AR and DLC Coatings, Del Mar Photonics, Nov. 2012, URL: https://www.youtube.com/watch?v=Chg9SWcJNLw.

Germanium Windows/Substrates, Electro Optical Components, Inc., 2017, URL: http://www.eoc-inc.com/germanium_windows.htm.

The First Chinese Office Action for Chinese Patent Application No. 2018115256038, Dec. 16, 2019, CNIPA, China.

* cited by examiner

INFRARED CAMERA ASSEMBLY FOR A VEHICLE

CROSS-REFERENCE TO RELATED APPLICATIONS

This application claims the benefit of U.S. Provisional Application No. 62/610,739 filed on Dec. 27, 2017. This application is also a continuation-in-part of U.S. patent application Ser. No. 15/841,995, filed Dec. 14, 2017, now allowed, and of U.S. patent application Ser. No. 15/799,436, filed Oct. 31, 2017, now pending. The contents of the above mentioned applications are hereby incorporated by reference.

TECHNICAL FIELD

The present disclosure relates generally to automotive safety and driving systems, and more specifically to infrared camera assemblies for use in automotive safety and driving systems.

BACKGROUND

As sensor-based technology has improved dramatically in recent years, new uses for sensors and, specifically, cameras, have become possible. Applications of cameras include use in vehicle safety and autonomous or assisted driving systems. For many of these applications, it is desirable to deploy the camera in a configuration that minimizes interference with either other vehicle systems or with the driver's field of view. As a result, vehicle designers have been seeking to reduce camera sizes and identify optimal camera placement locations.

One type of camera that may be utilized in many applications is a thermal infrared camera. Thermal infrared (IR) cameras capture image wavelengths in the range of seven and a half to fourteen micrometers. A typical IR camera uses an infrared sensor to detect electromagnetic waves of the infrared spectrum which lie outside of the visible light range, which are guided to the sensor through the camera's lens. IR cameras can be utilized for a variety of imaging applications including, but not limited to, passive motion detection, night vision, thermal mapping, health care, building inspection, surveillance, and the like. Recently, an attempt has been made in the IR industry to integrate IR cameras in advanced driver assistance systems and autonomous vehicle systems.

One type of IR sensor is an uncooled far infrared (FIR) sensor with a small form factor. Due to recent technological advances, e.g., advanced wafer level packaging, such sensors can be mass-produced at low-cost. In a typical arrangement, an uncooled FIR sensor does not require a cryocooler for proper operation, but does require a shutter to correct fixed pattern noises, which occur in response to ambient temperature changes, as well as slow changes in sensing materials.

While using a shutter may improve the quality and accuracy of the thermal image captured by an IR sensor, having a blackout period of tenths of a second is not acceptable in certain applications. For example, using a shutter-based FIR camera in advanced driver assistance systems and autonomous vehicle systems can pose a high risk, as the camera must frequently shut off for a few hundreds of milliseconds. In addition, shutters include moving parts that wear out over time. This may cause a camera malfunction during driving and shorten the life time of the camera.

Further, a shutter adds to the size and weight of a camera. Of particular interest for driver assistance and other vehicle systems is proper placement of a camera while minimizing interference with, for example, the view of the driver or other automotive systems. Further, it is desirable to be able to conveniently remove obstructions, such as icing and fogging from the camera or any layer placed between the camera and the scene to be captured, particularly for IR cameras.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include an infrared camera assembly for a vehicle. The assembly includes: a vehicle component having a front surface; a shutterless far-infrared (FIR) camera mounted within the vehicle component, wherein the shutterless FIR camera is utilized to output at least one thermal video stream processed by the autonomous vehicle system; and a protective window disposed on at least a portion of the front surface of the vehicle component, where the protective window is positioned to be aligned with a lens of the FIR camera, so as to allow the shutterless FIR camera to capture images therethrough.

Certain embodiments disclosed herein also include a vehicle, comprising an autonomous vehicle system; a vehicle component having a front surface; a shutterless far-infrared (FIR) camera mounted within the vehicle component, wherein the shutterless FIR camera is utilized to output at least one thermal video stream processed by the autonomous vehicle system operable in a vehicle; and a protective window disposed on at least a portion of the front surface of the vehicle component, wherein the protective window is positioned to be aligned with a lens of the FIR camera, thereby allowing the shutterless FIR camera to capture images therethrough.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
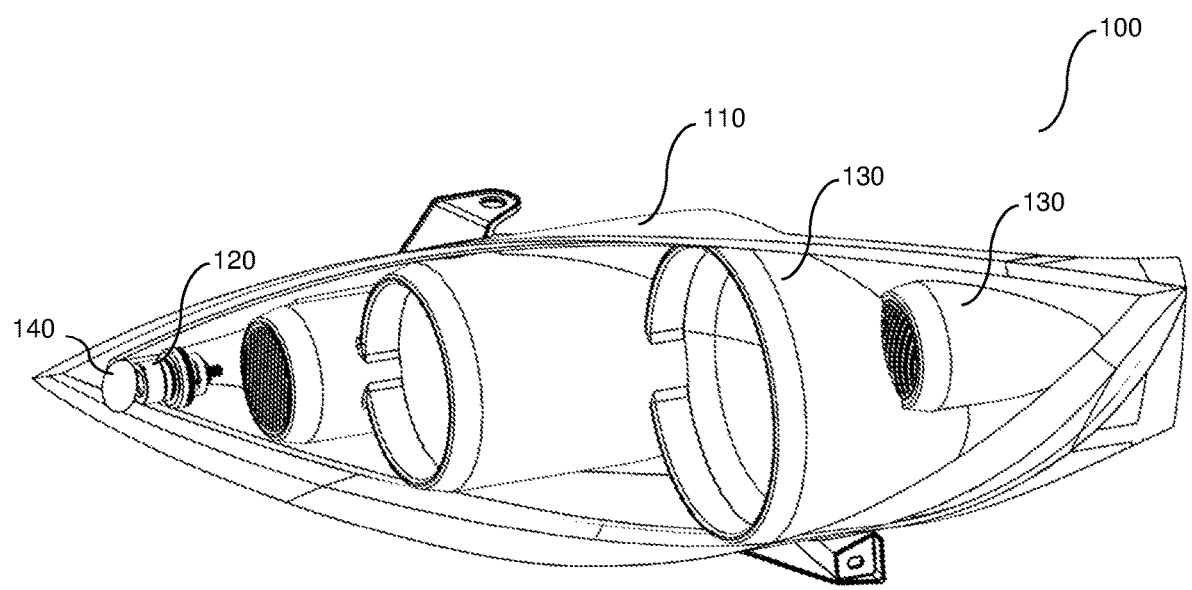
FIG. 1 is a perspective view of a headlight assembly, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include an infrared camera assembly for a vehicle. The disclosed embodiments includes a vehicle component, such as a headlight assembly, that includes a camera disposed therein, e.g., an infrared or far infrared (FIR) camera. In an embodiment, the headlight assembly includes a visible light-transparent front surface, an infrared-transparent protective window disposed in the front surface, a light source, e.g., a headlight, and a camera. The infrared-transparent window is disposed on a front surface of the headlight assembly in front of an infrared sensor of the camera, thereby allowing the camera to capture infrared radiation. The disclosed embodiments allow for deployment of cameras within various locations on or in a vehicle, including, but not limited to, headlight assemblies, grills, bumpers, windshields, and the like. Depending on the positioning of the camera, the vehicle wipers or other cleaning devices may be used for cleaning any surface in front of the camera, including the infrared-transparent protective window or lenses, to ensure its view remains unobstructed. Additionally, the amount of infrared-transparent material needed to allow passage of infrared light to the camera is minimized to reduce costs of production by only requiring a small window of infrared-transparent material directly in front of the camera rather than the entirety of the front surface of the assembly.

FIG. 1 shows a front schematic view of an example headlight assembly 100, according to an embodiment. The headlight assembly 100 includes an enclosure 110 having a front surface (not shown), a shutterless FIR camera 120 placed inside an internal volume of the headlight assembly 100, one or more light sources 130, and a protective window 140 placed in front of the camera 120. In some implementations, the headlight assembly 100 further includes a mounting bracket utilized to mount the camera 120 within the enclosure 110.

It should be noted that as the camera is an FIR camera, visible light is not required to illuminate a scene to be captured. Thus, the camera 120 may be mounted separately from the light sources 130 within the enclosure 110. No customized light arrangements are required, such as light sources that surround or encompass the camera 120, or any similar configuration.

The front surface of the enclosure 110 is transparent at least to visible light, thereby allowing for passage of light emitted by the light source 130, e.g., a high beam light bulb, to an area, for example, in front of a vehicle. More specifically, the front surface may be made of a material that is transparent to visible light but not to infrared light.

In an embodiment, the protective window 140 is disposed in the front surface of the enclosure 110. As a non-limiting example, the front surface may be a glass lens, which is transparent to light within the visible spectrum, but not to infrared light, from which a portion is cut out to create a cavity (not shown) in the front surface. The protective window 140 is made of a material transparent to infrared light, though it may be a material that is not transparent to visible light, and may be disposed in the cavity. In this embodiment, the front surface and the protective window 140 may be made of different materials to allow visible and FIR light to pass therethrough.

In an embodiment, the camera 120 is an infrared camera, and the window 140 is transparent to infrared radiation, thereby allowing passage of infrared radiation through the window 140 and to an infrared sensor (not shown) of the camera 120. More specifically, the infrared-transparent window 140 is sufficiently transparent so as to allow passage of an amount of infrared radiation that is detectable by the camera 120. In an embodiment, the shape of the window 140 is approximately the same as the lens of the camera 120 so as to minimize costs, e.g., not requiring the entirety of the front surface to be made from infrared-transparent material, if more costly, while still allowing infrared radiation emissions to pass therethrough and be detected by the camera 120.

In a further embodiment, the camera 120 is a far infrared (FIR) camera that is designed to have a minimal form factor in order to further adapt the camera 120 for placement in various location within a vehicle, such as the headlights enclosure. An example FIR camera is described further in U.S. patent application Ser. No. 15/841,995, now allowed and assigned to the common assignee, the contents of which are hereby incorporated by reference.

The amount of infrared radiation allowed to pass through the infrared-transparent portion may further be sufficient to provide a predetermined threshold amount or proportion of infrared radiation to pass through. The threshold may differ depending on the intended use of images captured by the camera 120, a required clarity of such images, both, and the like. In various implementations, the protective window 140 may be made of a material that maximizes infrared radiation transparency, or may maximize infrared radiation transparency subject to other constraints (e.g., while maintaining a sufficient degree of durability).

To this end, the protective window 140 may be made of materials such as, but not limited to, germanium. An example window that may be suitable for use according to at least some of the disclosed embodiments is described further in U.S. patent application Ser. No. 15/799,436, now pending and assigned to the common assignee. Such a window may be suitably transparent, and may further allow for a resistive heating element as described therein to provide removal of icing and fogging on the window.

The protective window 140 may include an outer surface coated to protect against damage, reduce reflection, and the like. In an example implementation, a first outer surface may be coated with a high durability coating to reduce scratching, and a second outer surface may be coated with an anti-reflective (AR) coating to reduce glare.

In an example implementation, the high durability coating can withstand exposure to adhesion, humidity, and moderate abrasion test conditions. The adhesion test conditions may include pressing and removing an adhesive surface of cellophane tape to each of the coated surfaces, the humidity test may include placing the protective window 140 in a test chamber having a temperature of 120 degrees Fahrenheit, and 95-100% relative humidity, and the moderate abrasion test may include rubbing at least 50 strokes across each coated surface with an abrasive.

In a further embodiment, the protective window 140 includes an infrared-transparent durable hard coated surface on an outer layer, such as a diamond-like carbon (DLC) coating. The DLC coating allows for various diamond-like qualities, including high hardness, low friction, and high chemical inertness, which increases resistance to corrosion or undesirable reactions that could impeded the transparency of the protective window 140.

According to a further embodiment, the assembly may include a cleaning mechanism (not shown) placed between the protective window 140 and the camera 120. The cleaning mechanism can include various methods and mechanisms configured to ensure that the camera 120 is free from obstructions that negatively affect images or video captured using the camera 120. For example, a wiping mechanism or a defrost mechanism may be placed between the camera 120 and the protective window. In an embodiment, the cleaning mechanism is in addition to a cleaning mechanism configured to clear the front surface, such as headlight wipers. In some embodiments, the cleaning mechanism may be placed in from of the protective window 140.

In a further embodiment, the assembly may include the camera 120 within a vehicle component without a protective window, where the lens of the camera 120 is fully exposed.

In a further embodiment, the assembly includes an internal calibration mechanism (not shown). The internal calibration mechanism may be required when the infrared camera is positioned a separate environment than an intended captured external scene, as the large difference between an internal temperature and an external temperature may cause difficulty in accurately capturing infrared images. Thus, the internal calibration mechanism may be configured to compensate for such differences.

Figure 2A:
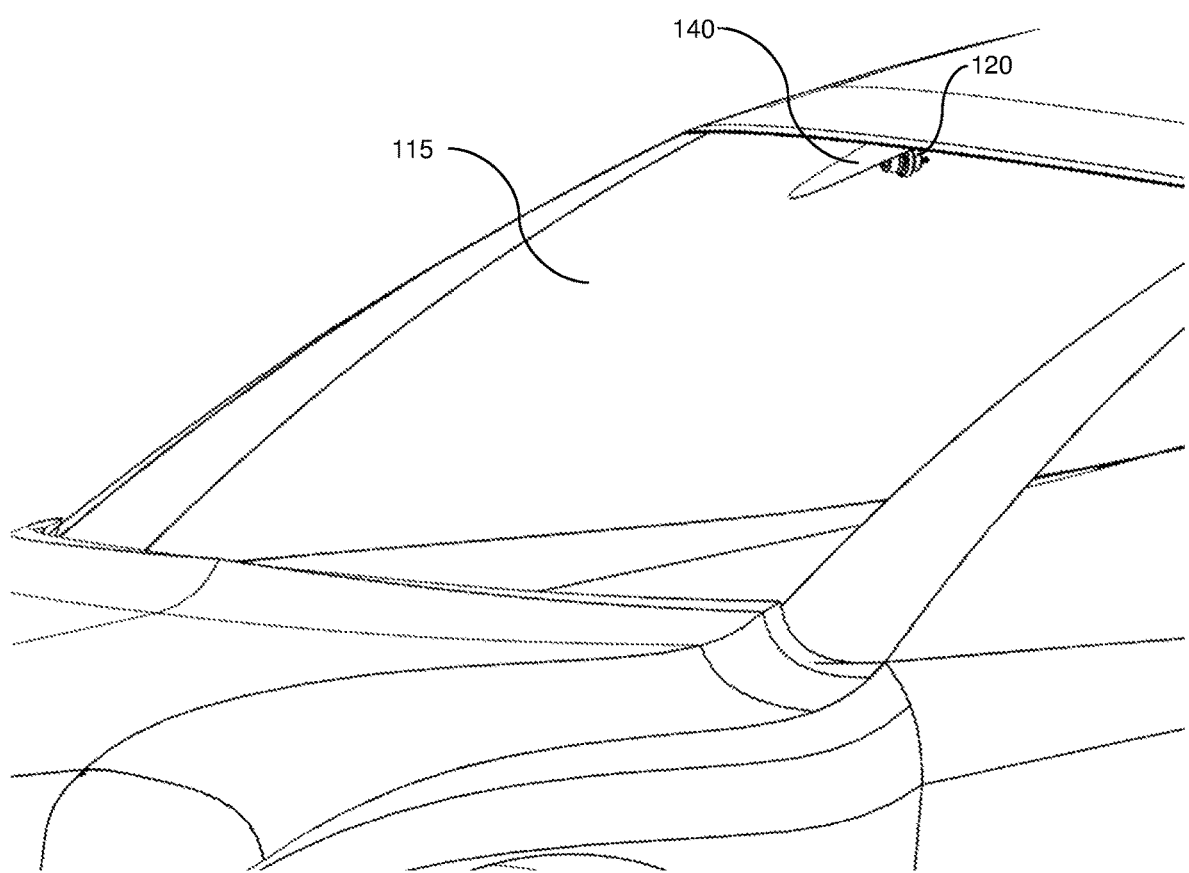
FIG. 2A is a perspective view of an infrared camera installed behind a windshield, according to an embodiment.

FIGS. 2A-2E are perspective views of an infrared camera 120 installed at various locations on a vehicle. FIG. 2A show an infrared camera 120 placed behind a windshield 115. In the shown embodiment, the camera 120 is placed at an upper portion of the windshield 115, with the protective window 140 positioned directly in front of the camera 120. The shape of the protective window 140 may be adjusted as necessary. The features of the protective window 140 embedded within a windshield include each of the features discussed above in FIG. 1.

Figure 2B:
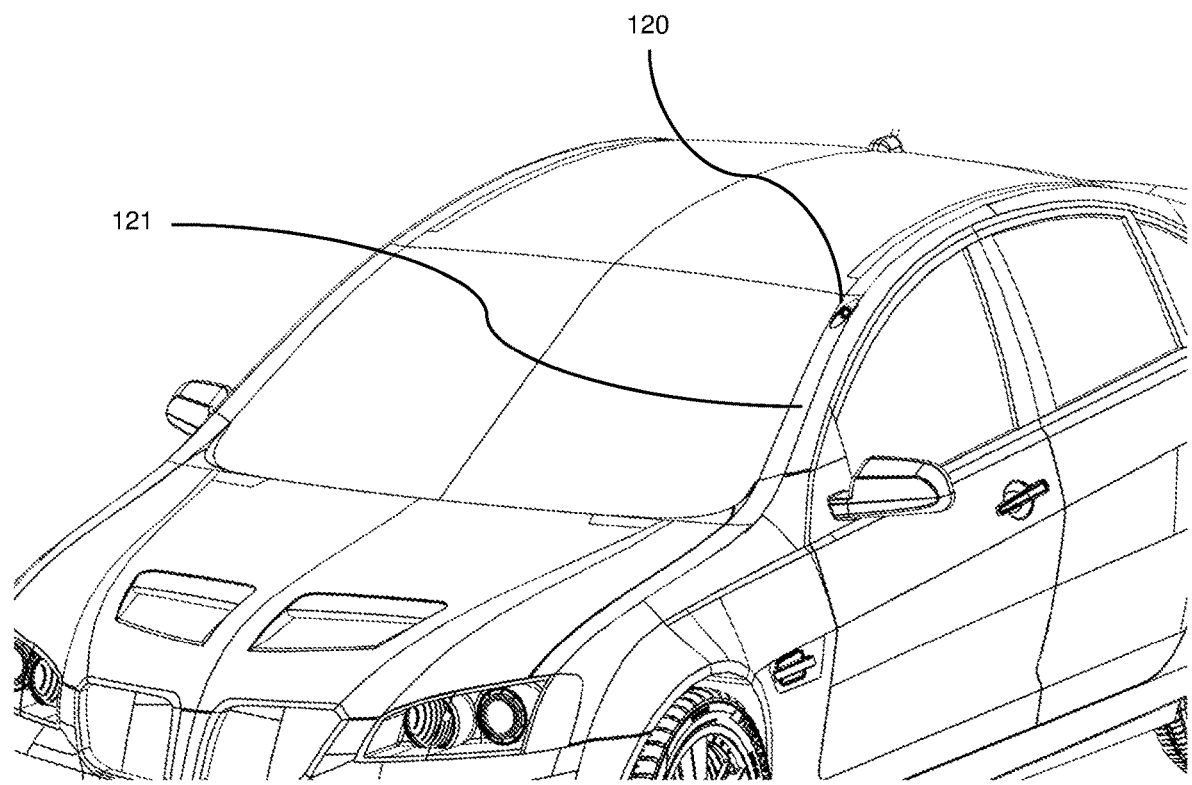
FIG. 2B is a perspective view of an infrared camera installed within a vehicle pillar frame, according to an embodiment.
Figure 2C:
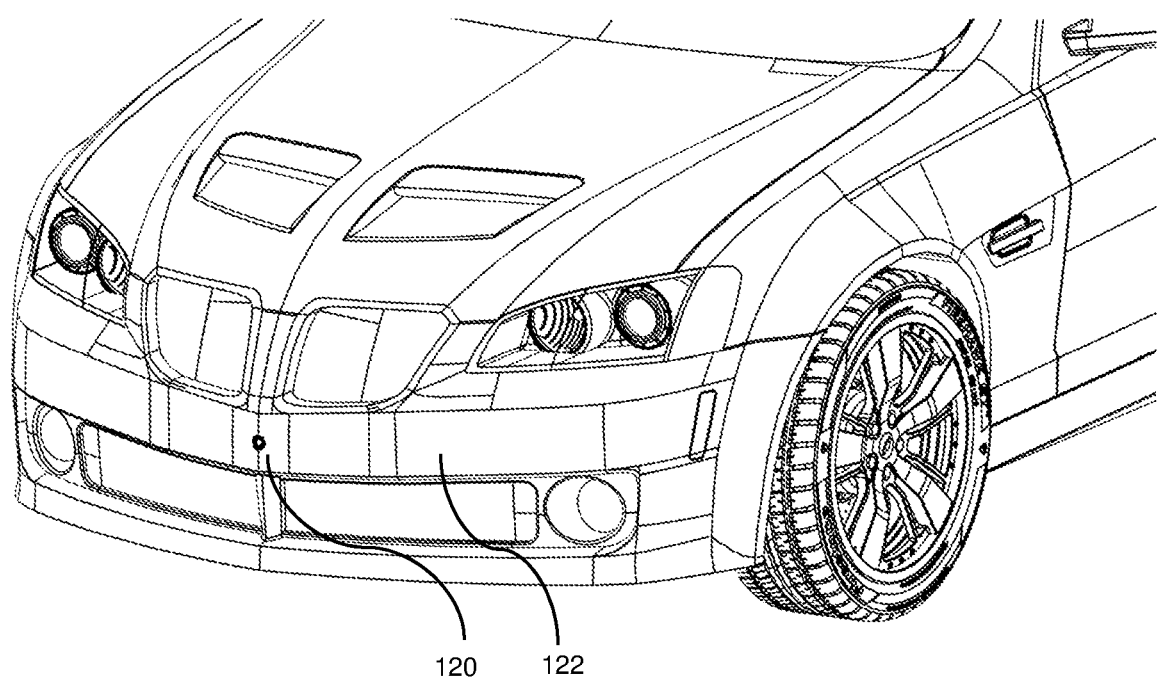
FIG. 2C is a perspective view of an infrared camera installed in a vehicle bumper, according to an embodiment.
Figure 2D:
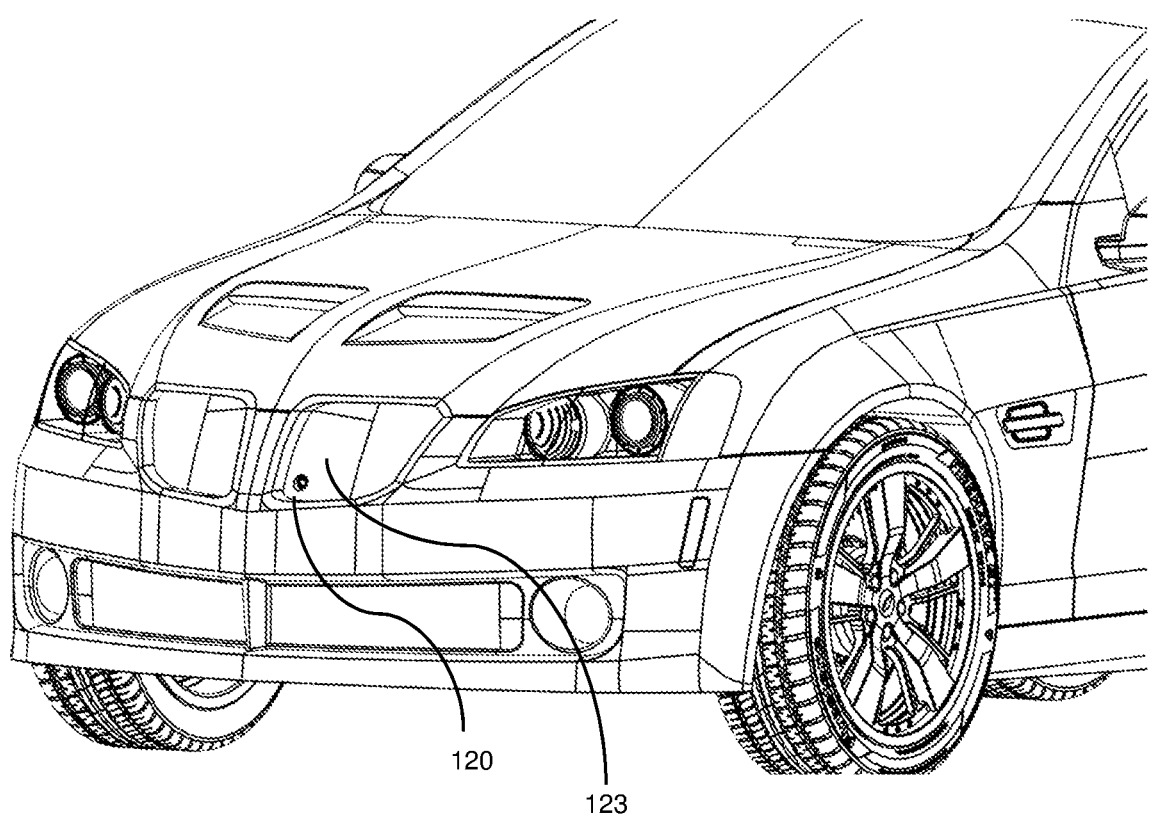
FIG. 2D is a perspective view of an infrared camera installed in a vehicle grill, according to an embodiment.
Figure 2E:
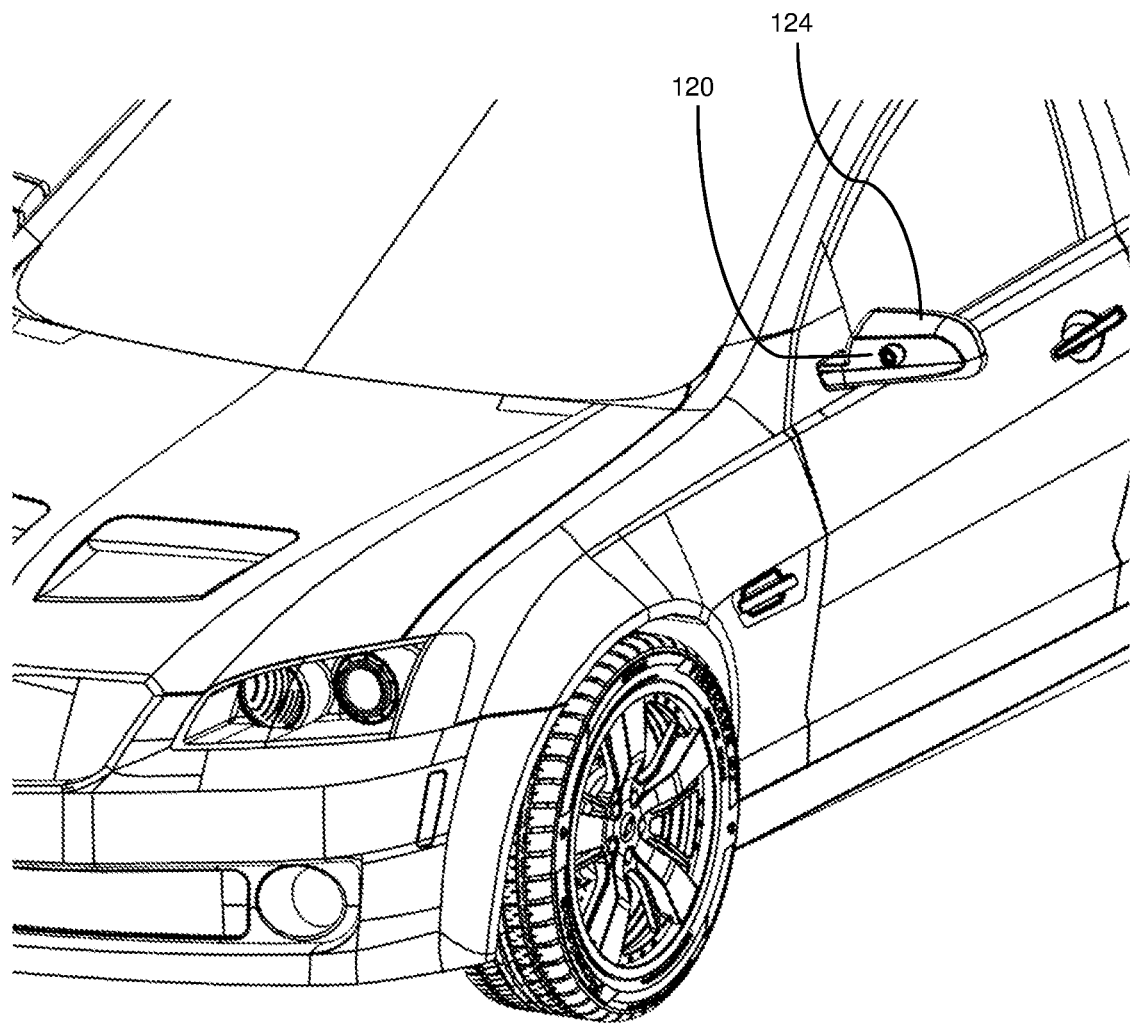
FIG. 2E is a perspective view of an infrared camera installed within a side mirror, according to an embodiment.

FIG. 2B is a perspective view of the infrared camera 120 placed within the A-pillar 121 of a vehicle. Such a placement requires the reduced camera size offered by a shutterless FIR camera. FIG. 2C is a perspective view of the infrared camera 120 placed within a front bumper 122 of a vehicle. The font bumper allows for a low and central placement of the camera, and may be configured to include a protective window (not shown) in front of the camera assembly. FIG. 2D shows a perspective view of a nearby placement of the infrared camera 120 within the grill 123 of a vehicle, allowing for a slightly elevated positioning compared to the bumper. FIG. 2E is a perspective view of the infrared camera 120 placed on the driver side mirror 124.

In some embodiments, non-central positioning of the camera, such as those shown in FIGS. 2A, 2B, 2D and 2E, allows for placement of a second camera at an equal distance on the other side of the vehicle, allowing for the capture of stereo vision, if so desired.

It should be noted that the positions shown in the figures above are in no way intended to be limiting, and the infrared camera 120 may be placed in any position within or on a vehicle that permits proper functioning of the infrared camera 120.

Figure 3:
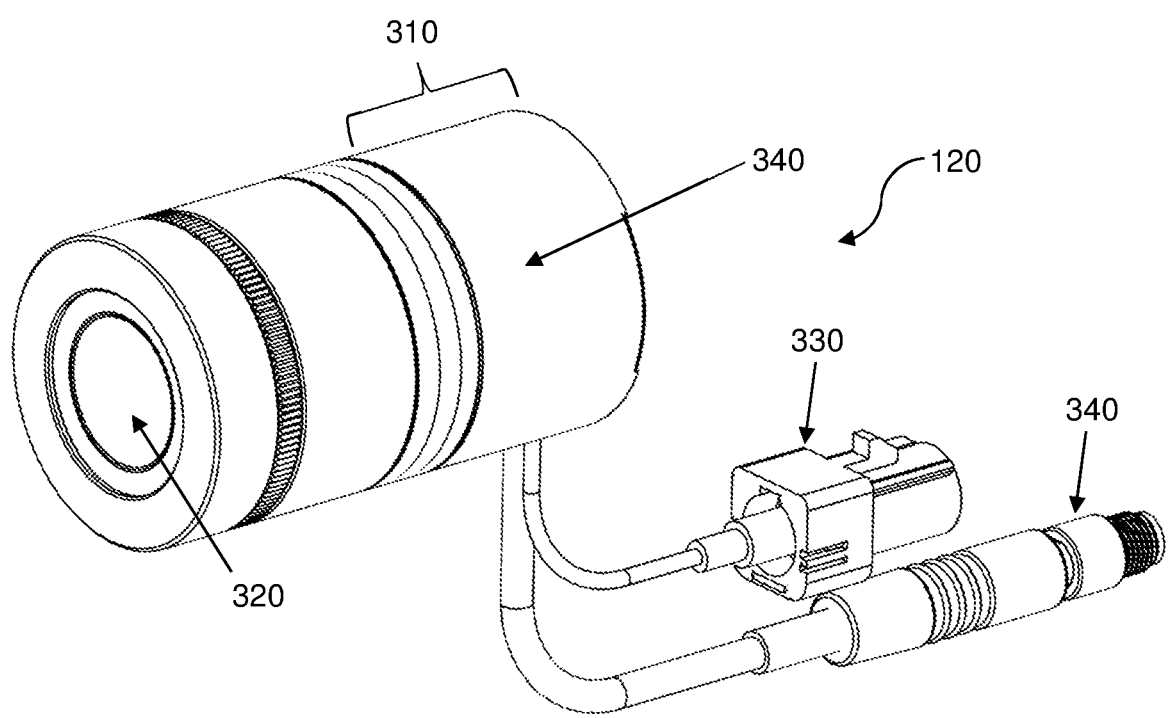
FIG. 3 is a schematic diagram of an infrared camera apparatus, according to an embodiment.

FIG. 3 shows a schematic diagram of a shutterless FIR camera apparatus (hereinafter the camera apparatus 120), according to an embodiment. The camera apparatus 120 includes a thermal core 310 disposed in a housing 340, a lens 320, and an electrical component 330. The camera apparatus 120 may be a shutterless camera that does not require internal moving parts to capture infrared images.

The thermal core 310 includes components utilized for capturing infrared images such as, but not limited to, a substrate, an infrared imager, thermally conductive members (not shown in FIG. 3), and at least a portion connected to the electrical component 330.

The lens 320 is an optical lens configured to collect, focus, or collimate infrared light, or a combination thereof. The infrared light is captured by a sensor (not shown) disposed in the thermal core 310.

The electrical component 330 is configured to provide power to the thermal core 310 and sensor. An additional connection, such as a data connection 340, may be provided and configured to allow for the transfer of captured images or video to a receiver, e.g., a video decoder. To this end, the data connection 340 may include a cable, such as a gigabit multimedia serial link cable.

Thermal video streams as output by the camera apparatus 120 can be utilized for the detection of vehicles, pedestrians, animals, two-wheelers, black-ice spots, litter, debris, potholes, gully covers, curbs and so on, as well as for performing other tasks necessary for autonomous driving operation. In an embodiment, a computer (not shown) may be an onboard vehicle computer or a dedicated computer installed in a vehicle (not shown) and communicatively connected with the camera apparatus 120.

Use of a compact camera apparatus, such as the camera apparatus 120, may allow for more convenient placement of the camera in headlight assemblies, as compared to cameras having a larger form factor. Similarly, in embodiments of the infrared camera assembly where the camera is disposed within a bumper, a grill, a windshield, and the like, as shown, for example, in FIGS. 2A-2E, a smaller form factor allows for placement of the camera in more confined areas, requiring minimal space and is therefore more flexible in terms of viable installation locations.

In an embodiment, the thermal core 310 of the camera assembly 120 includes multiple substrates, thermally conductive members, and one or more connection members (none shown). The substrates have an imager disposed thereon for image reception. The thermally conductive members are configured to remove heat from the thermal core 310 and, particularly, to mitigate heat from the substrates that may cause distortions or other reductions in image quality of the imager.

The thermally conductive members are utilized as spacers between the substrates. Accordingly, the thermally conductive member allows for heat distribution away from the imager through a back side of the substrate and out of the camera housing. In some implementations, the substrate 310-1 may have disposed thereon a thermal uniformity member (not shown) such as, but not limited to, a copper coin insert. The thermal uniformity member may be made of thermally conductive material (e.g., copper) such that heat from the substrate is not concentrated on a single point on the imager. The imager may be affixed to the thermal uniformity member of the substrate.

It should be noted that the infrared camera apparatus 120 shown in FIG. 3 is merely an example, and that the camera deployed in the assembly according to the disclosed embodiments is not limited to the particular structure shown in FIG. 3. The example infrared camera apparatus 120 may be configured as described further in the aforementioned U.S. patent application Ser. No. 15/841,995, or may include variations thereof.

The shutterless FIR camera discussed herein may be designed for advanced driver assistance systems and autonomous vehicle systems and should meet additional constraints other than safety. Such constraints include a small form factor, accurate and low latency image processing, and low-power consumption. This may include shutterless FIR cameras optimized to operate or be integrated in advanced driver assistance systems and autonomous vehicles systems.

Figure 4:
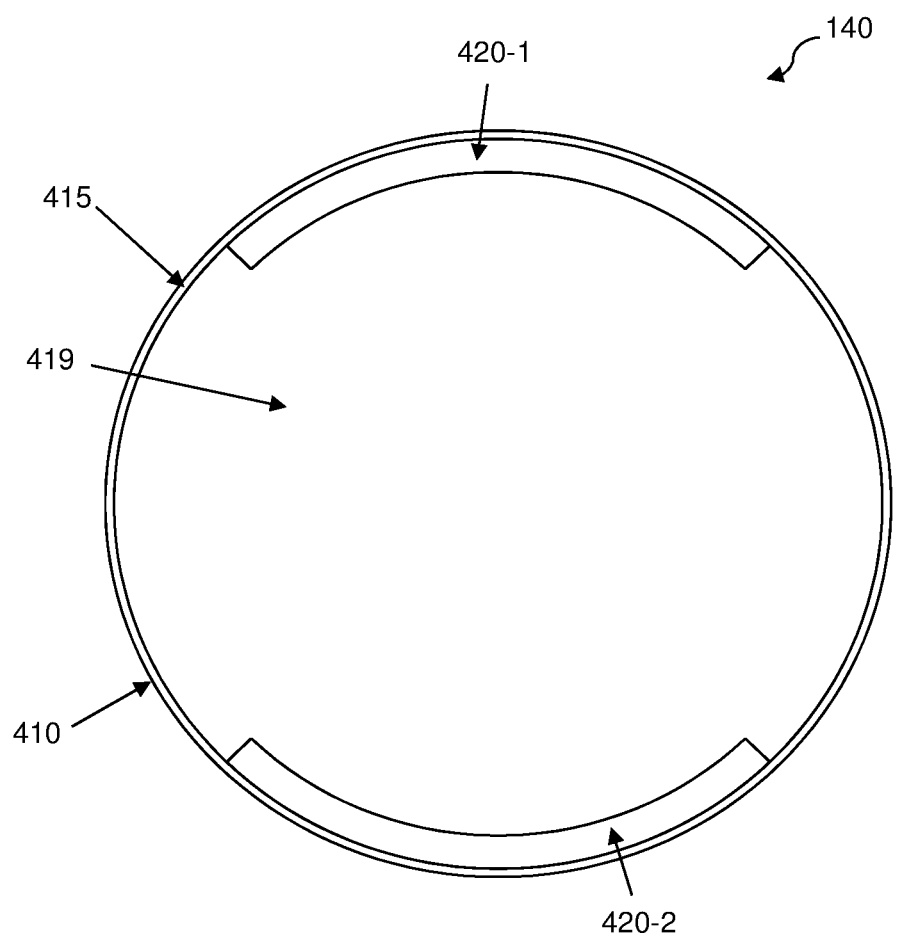
FIG. 4 is a front view of a protective window with resistive heating, according to an embodiment.

FIG. 4 shows a front view of a protective window 140 with resistive heating according to an embodiment. The window 140 includes a transparent member 410 and two conductive pads 420-1 and 420-2. The window 140 includes a transparent member 410 with an outer edge 415. Each of the conductive pads 420-1 and 420-2 is disposed on the outer edge 415 such that least a portion of the transparent member 410 is not covered by the conductive pads 420-1 and 420-2 and, thus, is exposed, thereby allowing light to pass through the exposed portion. In an example implementation, the conductive pads 420-1 and 420-2 may be disposed on opposing portions of the transparent member 410.

The conductive pads 420-1 and 420-2 conduct electricity from a source of electricity (not shown) connected thereto. During operation, electricity from the source of electricity is conducted through the conductive pads 420-1 and 420-2 to the transparent member 410 such that electricity conducted through the transparent member 410 causes, via resistive heating, evaporation of liquids (e.g., water droplets), solids (e.g., ice), or both, from the transparent member 410. In an embodiment, the transparent member 410 is made of a semiconductor material such as, but not limited to, an N-type Germanium (GE) semiconductor.

The transparent member 410 is appropriately resistive or conductive to allow for resistive heating. To this end, in an embodiment, the transparent member 410 has a resistivity between 3 ohm centimeter ($\Omega \cdot cm$) and 15 $\Omega \cdot cm$, inclusive. This range of resistivities may be preferred in some applications, for example when using the window 100 in an infrared camera. It should be noted that other resistivities may be utilized for the transparent member 410 depending on the size of the window 140, the power source providing electricity to the window 140, required temperatures for resistive heating, and other factors according to at least some disclosed embodiments.

In an embodiment, the transparent member 410 is made from a first material having low conductivity, and the conductive pads 420-1 and 420-2 are made of a second material having high conductivity allowing for conduction of electricity to the transparent member 410. As an example, the second material may be copper. During operation, the conductive pads may be electrically connected to a source of electricity such that electricity is conducted through the conductive pads and the transparent member, thereby heating the transparent member via resistive heating. The resistive heating may cause, for example, evaporation of water droplets or ice formed on the transparent member.

In an embodiment, the source of electricity that is electrically connected to the window may be controlled by a controller in order to ensure that liquids and solids deposited or forming on the window are evaporated, thereby clearing the transparent window. The controller may be configured to determine when an obstruction that can be cleared via heating is disposed on the transparent member 410 and, if so, to cause provision of electrical current to the conductive pads 420-1 and 420-2 and through the transparent member 410, thereby causing resistive heating.

It should be noted that two conductive pads 420-1 and 420-2 are shown in FIG. 4 merely for example purposes and without limitation on the disclosed embodiments. The window as described herein is not limited to the particular configuration shown in FIG. 4, and may include any number of sets of conductive pads covering any portion of the transparent member 410 without departing from the scope of the disclosure. Each set of conductive pads includes two conductive pads.

Figure 5:
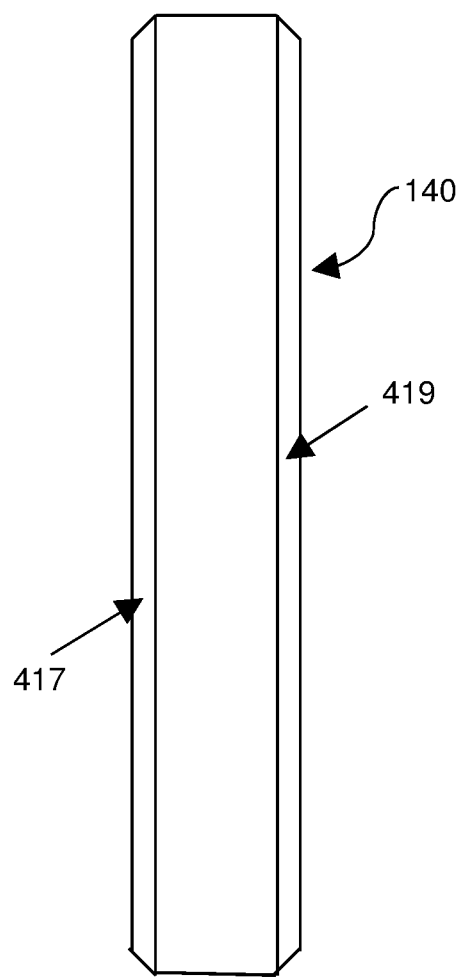
FIG. 5 is a side view of the protective window, according to an embodiment.

FIG. 5 shows a side view of the protective window 140 according to an embodiment. As shown in FIG. 4, the transparent member 410 of the window 140 includes a first outer surface 417 and a second outer surface 419. Each of the outer surfaces 417 and 419 may be coated to protect against damage to the transparent member 410, reduce reflection, and the like. In an example implementation, the first outer surface 417 may be coated with a high durability coating to reduce scratching, and the second outer surface 419 may be coated with an anti-reflective (AR) coating to reduce glare. The high durability coating may be, but is not limited to, diamond-like carbon.

According to some embodiments, the FIR camera discussed above can be replaced by a multi-sensor module that can be located in multiple locations on a vehicle. The multi-sensor module may include a FIR sensor, a CMOS sensor (camera), a solid-state Lidar, and the like. The multi-sensor module is designed to support low-level fusion. The multi-sensor module is structured as a single mounting module with other sensors, and may simplify calibration procedures during manufacturing, because the sensors can be calibrated, with respect to another before the module is mounted on the vehicle. The mounting location of the multi-sensor module may be next, or very close to a headlight module in the same housing, but outside of the reflector. The mounting or assembling locations may include front, rear, and side surfaces of the vehicle. The multi-sensor module may also be located in other locations as discussed in detailed above. For example, such locations may be behind the windshield, in the grill of the vehicle and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An infrared camera assembly for an autonomous vehicle system, comprising:
    a vehicle component having a front surface;
    a shutterless far-infrared (FIR) camera mounted within the vehicle component, wherein the shutterless FIR camera is utilized to output at least one thermal video stream processed by the autonomous vehicle system operable in a vehicle;
    a protective window disposed on at least a portion of the front surface of the vehicle component, wherein the protective window is positioned to be aligned with a lens of the FIR camera, thereby allowing the shutterless FIR camera to capture images therethrough; and
    wherein the vehicle component is a headlight assembly of the vehicle.

2. The infrared camera assembly of claim 1, wherein the vehicle component is a front grill of the vehicle.

3. The infrared camera assembly of claim 1, wherein the vehicle component is a bumper of the vehicle.

4. The infrared camera assembly of claim 1, wherein the vehicle component is a windshield of the vehicle.

5. The infrared camera assembly of claim 1, wherein the vehicle component is at least one mirror of the vehicle.

6. The infrared camera assembly of claim 1, wherein the vehicle component is a frame of the vehicle.

7. The infrared camera assembly of claim 1, wherein the protective window comprises an infrared transparent material.

8. The infrared camera assembly of claim 7, wherein the infrared transparent material is coated with a hard coated surface.

9. The infrared camera assembly of claim 8, wherein the hard coated surface is a diamond-like coating (DLC).

10. The infrared camera assembly of claim 1, wherein the protective window includes germanium.

11. The infrared camera assembly of claim 10, wherein the protective window further comprises:
    a resistive heating element configured to prevent fogging or icing of the protective window.

12. The infrared camera assembly of claim 1, further comprising:
    a thermal core disposed within a camera housing;
    a lens; and
    an electrical component configured to provide power to the FIR camera, and to provide a data transfer connection to the FIR camera.

13. The infrared camera assembly of claim 1, further comprising:
    an internal calibration mechanism configured to compensate temperature differences between an internal temperature within the infrared camera assembly and an external temperature of an external scene.

14. The infrared camera assembly of claim 1, wherein the protective window is configured to allow a predetermined threshold amount of infrared radiation to pass therethrough.

15. The infrared camera assembly of claim 1, wherein the protective window comprises:
    a transparent member having an outer edge, wherein the transparent member is made of a first material, wherein the first material is a low conductivity material; and
    at least one set of two conductive pads disposed on the outer edge of the transparent member and electrically coupled to at least one source of electricity, wherein each conductive pad is made of a second material, wherein matter disposed on the transparent member is removed via resistive heating when electricity is conducted from the at least one source of electricity through the at least one set of two conductive pads and the transparent member.

16. The infrared camera assembly of claim 1, wherein an autonomous vehicle system further includes an advanced driver assistance system.

17. The infrared camera assembly of claim 1, further comprising:
    a cleaning mechanism placed between the protective window and the shutterless FIR camera.

18. A vehicle, comprising:
    an autonomous vehicle system;
    a vehicle component having a front surface;
    a shutterless far-infrared (FIR) camera mounted within the vehicle component, wherein the shutterless FIR camera is utilized to output at least one thermal video stream processed by the autonomous vehicle system operable in a vehicle;
    a protective window disposed on at least a portion of the front surface of the vehicle component, wherein the protective window is positioned to be aligned with a lens of the FIR camera, thereby allowing the shutterless FIR camera to capture images therethrough; and
    wherein the vehicle component is a headlight assembly of the vehicle.

* * * * *